United States Patent [19]

Thompson et al.

[11] Patent Number: 5,298,694
[45] Date of Patent: Mar. 29, 1994

[54] ACOUSTICAL INSULATING WEB

[75] Inventors: Delton R. Thompson, Mahtomedi; Joseph A. Stroh, Vadnais Heights, both of Minn.

[73] Assignee: Minnesota Mining and Manufacturing Company, St. Paul, Minn.

[21] Appl. No.: 6,415

[22] Filed: Jan. 21, 1993

[51] Int. Cl.$^5$ ............................................. E04B 1/82
[52] U.S. Cl. ................................. 181/286; 181/290; 181/294; 181/296; 428/903; 428/255; 428/297; 428/298; 428/247; 428/284
[58] Field of Search ............... 181/286, 290, 294, 296; 428/903, 255, 297, 298, 247, 284

[56] References Cited

U.S. PATENT DOCUMENTS

| | | |
|---|---|---|
| T100,902 | 8/1981 | Hauser . |
| 3,382,305 | 5/1968 | Breen ................... 264/171 |
| 3,546,063 | 12/1970 | Breen ................... 161/176 |
| 4,011,067 | 3/1977 | Carey, Jr. ................... 55/354 |
| 4,041,203 | 8/1977 | Brock et al. ................... 428/298 X |
| 4,069,026 | 1/1978 | Simm et al. ................... 55/6 |
| 4,118,531 | 10/1978 | Hauser ................... 428/224 |
| 4,196,245 | 4/1980 | Kitson et al. ................... 428/297 X |
| 4,379,192 | 4/1983 | Wahlqvist et al. ............. 428/903 X |
| 4,420,520 | 12/1983 | Jones et al. ................... 428/42 |
| 4,420,526 | 12/1983 | Schilling et al. ................... 428/171 |
| 4,469,732 | 9/1984 | Isaksen et al. ................... 428/80 |
| 4,551,378 | 11/1985 | Carey, Jr. ................... 428/198 |
| 4,588,627 | 5/1986 | Isaksen et al. ................... 428/80 |
| 4,588,635 | 5/1986 | Donovan ................... 428/288 |
| 4,604,302 | 8/1986 | Isaksen et al. ................... 427/208.6 |
| 4,696,848 | 9/1987 | Jones et al. ................... 428/80 |
| 4,813,948 | 3/1989 | Insley ................... 604/366 |
| 4,828,910 | 5/1989 | Haussling ................... 428/284 |
| 4,837,067 | 6/1989 | Carey, Jr. et al. ................... 428/108 |
| 4,840,832 | 6/1989 | Weinle et al. ................... 428/156 |
| 4,851,283 | 7/1989 | Holtrop et al. ................... 428/284 |
| 4,859,512 | 8/1989 | Jones et al. ................... 428/40 |
| 4,865,791 | 9/1989 | Ferro et al. ................... 264/134 |
| 4,873,132 | 10/1989 | Jones et al. ................... 428/80 |
| 4,992,327 | 2/1991 | Donovan et al. ................... 428/296 |
| 5,073,436 | 12/1991 | Antonacci et al. ............. 428/903 X |
| 5,118,722 | 6/1992 | Wollmann et al. ................... 521/137 |

OTHER PUBLICATIONS

ASTM F 778-88, Standard Methods for Gas Flow Resistance Testing of Filtration Media.
Davies, C. N., "The Separation of Airborne Dust and Particles," Institute of Mech. Engineers, London, Proceedings 1B, 1952.

(List continued on next page.)

Primary Examiner—Michael L. Gellner
Assistant Examiner—Khanh Dang
Attorney, Agent, or Firm—Gary L. Griswold; Walter N. Kirn; Richard T. Knauer

[57] ABSTRACT

A method for attenuating sound waves passing from a source area to a receiving area comprises the steps of providing a nonwoven acoustical insulation web comprising thermoplastic fibers, the web having an average effective fiber diameter of less than about 15 microns, a density of less than about 50 kg/m$^3$, and an air pressure drop across the web of at least about 1 Mm water at a flow rate of about 32 liters/min.; and positioning the web between the source area and the receiving area such that a major face of the web intercepts and thereby attenuates sound waves passing from the source area to the receiving area. Also, a laminate adapted to be applied to the inner panel of a vehicle door comprises the web and a second layer, such as a scrim, nonwoven fabric, film, or foil, laminated thereto. The laminate can be applied to the inner panel of a vehicle door so that the second layer provides water barrier protection and the web provides acoustical insulation. Also, a nonwoven acoustical insulation web comprising thermoplastic fibers, the web having an average effective fiber diameter of less than about 15 microns, a density of less than about 20 kg/m$^3$, and a pressure drop of at least about 1 mm water at a flow rate of about 32 liters/min. The web typically comprises melt-blown microfibers and crimped bulking fibers in a weight percent ratio of about 40:60 to about 95:5, respectively.

53 Claims, 2 Drawing Sheets

OTHER PUBLICATIONS

Wente, Van A., "Superfine Thermoplastic Fibers," *Industrial Engineering Chemistry*, vol. 48, pp. 1342 et seq. (1956).

Report No. 4364, Naval Research Laboratories, publ. May 25, 1954, "Manufacture of Superfine Organic Fibers," by Wente, Boone, and Fluharty.

3M Occupational Health and Environmental Safety Division, "3M Powersorb" brochure, Feb. 1991.

3M Occupational Health and Environmental Safety Division, "Powersorb Products" brochure, Jun. 1991.

3M Insulation and Specialty Fabrics, "Our New Insulation is Worth Its Lite Weight in Warmth" brochure, Jun. 1990.

3M Insulation and Specialty Fabrics, "Thinsulate Family of Products" brochure, Aug. 1992.

3M, "Thinsulate Lite Loft" brochure produced for Outdoor Retailers Trade Show, Feb. 1992.

ACOUSTICAL INSULATING WEB

FIELD OF THE INVENTION

The present invention relates to nonwoven acoustical insulation materials particularly useful in the transportation industry, e.g., for use in vehicles, airplanes, and trains, and for use in small appliances and architectural applications.

DESCRIPTION OF THE RELATED ART

Among public nuisances, noise problems are very prevalent and difficult to overcome. Noises from appliances, within buildings, from ventilation duct work, within vehicles, and other sources have been increasingly recognized as problem areas in recent years. Although various means and materials to control noise have been proposed, there have been no satisfactory, versatile materials for attenuating sound.

The choice of a particular sound insulating material for a given application is determined not only by its ability to attenuate sound but by other considerations as well. These include cost, weight, thickness, fire resistance, etc. For example, the technically well known sound attenuating materials include felts, foams, compressed fibers, glass powder or "rock wool," and recycled fabrics which have been hammer milled, resinated, and thermoset (shoddy materials). Unfortunately, there are disadvantages associated with each of these materials. Further, there has been a continuing need for acoustical insulation materials which exhibit superior sound attenuating properties.

Acoustical insulation materials are used in many applications in various industries. For example, vehicle manufacturers use acoustical insulation in vehicle doors. A vehicle door construction conventionally includes a layer of acoustical insulation or sound attenuating pad disposed inwardly of a water deflector. The water deflector closes various openings and holes in the vehicle door panel to prevent water from entering the vehicle interior. The sound pad attenuates sound by preventing sound waves from passing into the vehicle interior. The sound pad attenuates sound by either absorbing sound waves striking the pad or reflecting such sound waves outwardly and away from the vehicle interior.

Vehicle manufacturers typically carry out a two step process in providing a vehicle door with a water deflector and acoustical insulation. In the first step of this process, a water deflector, typically in the form of a film adhesively coated along its periphery, is adhered to the inner door panel to impart water barrier is properties to the vehicle door. Preferably, the adhesive comprises a material which permits subsequent repositioning of the water deflector. In the second step of the process, a sound pad is adhesively laminated to the water deflector after the water deflector is adhesively secured to the inner door panel.

U.S. Pat. No. 4,469,732 (Isaksen et al.) discloses a thin, flexible film, preferably comprising polyethylene, used as a water deflector in the door panel construction of a vehicle. Adhesive is applied to selected areas of the film to permit attachment of the film to the inner door panel of a vehicle.

U.S. Pat. No. 4,696,848 (Jones et al.) discloses a water deflector comprising a thin, flexible polyethylene film. The film includes a suitable pocket or bulge-like deformation which remains essentially in the plane of the film during handling and processing. The pocket or bulge-like deformation readily assumes a desired bulge-like configuration during final installation of the film onto an inner door panel of a vehicle to conform to discontinuities in the interior surface of the inner door panel. The deformation can be formed using either vacuum or pressure thermoforming techniques.

SUMMARY OF THE INVENTION

The present invention relates to the use of nonwoven acoustical insulation webs for sound attenuation. The webs exhibit superior acoustical properties, namely sound absorption and transmission loss properties. Sound absorption relates to the ability of a material to absorb incident sound waves, while transmission loss relates to the ability of a material to reflect incident sound waves. High sound absorption and high transmission loss values are considered desirable for acoustical insulation. The term "sound attenuation" refers to absorption and/or reflection of incident sound waves.

In brief summary, the invention provides a method for attenuating sound waves passing from a source area to a receiving area, comprising the steps of:

a) providing a nonwoven acoustical insulation web comprising thermoplastic fibers, the web having an average effective fiber diameter of less than about 15 microns, a density of less than about 50 kg/m$^3$, and a pressure drop of at least about 1 mm water at a flow rate of about 32 liters/minute ("L/min."); and b) positioning the web between the source area and the receiving area such that a major face of the web intercepts and thereby attenuates sound waves passing from the source area to the receiving area.

The average effective fiber diameter can be estimated by measuring the pressure drop of air passing through the major face of the web and across the web as outlined in the ASTM F 778-88 test method. As used herein, the term "average effective fiber diameter" means that fiber diameter calculated according to the method set forth in Davies, C. N., "The Separation of Airborne Dust and Particles," Institution of Mechanical Engineers, London, Proceedings 1B, 1952.

Most preferably, the average effective fiber diameter is between about 5 and about 10 microns, the density of the web is less than about 20 kg/m$^3$, and the pressure drop is between about 3 Mm water and about 10 Mm water at an air flow rate of 32 liters/min.

In another of its aspects, the invention relates to a laminate comprising the above web and a second layer laminated to the web to form the laminate. The second layer can be scrim, nonwoven fabric, film, or foil. Preferably, the laminate takes the form of an integral water deflector and layer of acoustical insulation and is adapted to be applied to the inner panel of a vehicle door. The second layer typically comprises a film or foil and can provide water barrier protection for the vehicle door, and the web is specially formulated to provide acoustical insulation for the door. Preferably, the web comprises a mixture of melt-blown microfibers and crimped bulking fibers, i.e., generally larger-diameter fibers, in a weight percent ratio of about 40:60 to about 95:5, respectively.

In another of its aspects, the invention relates to a method for preventing sound and water from entering a vehicle interior, wherein the above laminate is secured to a panel of a vehicle to attenuate sound waves which contact a major face of the web of the laminate and prevent the passage of water through the panel and into the vehicle interior.

The invention also relates to a process for manufacturing a vehicle door, comprising the steps of providing a vehicle door having outer and inner panels secured together with a space therebetween for accommodating various mechanisms, the inner panel comprising a recessed area having at least one opening, and securing the above laminate to the inner panel with the second layer of the laminate disposed adjacent to the inner panel so that the second layer can provide water barrier protection and the web can provide acoustical insulation.

The invention further relates to a nonwoven acoustical insulation web comprising thermoplastic fibers, wherein the web has an average effective fiber diameter of less than about 15 microns, a density of less than about 20 kg/m$^3$, and a pressure drop of at least about 1 mm water at a flow rate of about 32 liters/min.

Preferably, the average effective fiber diameter of the web is about 5 to about 10 microns, the density of the web is less than about 10 kg/m$^3$, and the pressure drop is about 3 mm water to about 10 mm water at a flow rate of about 32 liters/min. Further, the fibers preferably comprise a mixture of melt-blown microfibers and crimped bulking fibers in a weight percent ratio of about 40:60 to about 95:5, respectively. Also, the web can comprise very fine denier staple fibers having a denier of about 2 or less as well as additional staple fibers selected from the group consisting of binder fibers and static discharge fibers. The very fine denier staple fibers preferably comprise at least about 85 weight percent of the web.

In yet another aspect of the invention, the invention provides a laminate comprising:

a) a nonwoven web comprising thermoplastic fibers; and b) a second layer laminated to the web to form the laminate, wherein portions of the web and the second layer have been thermally consolidated to form reduced thickness areas which are of a thin gauge relative to other portions of the laminate.

Typically, the web would comprise acoustical insulation and the second layer would comprise a scrim, nonwoven fabric, foil, or film such as a thermoplastic film.

On an equivalent weight comparison, acoustical insulation webs of the invention provide enhanced acoustical properties relative to sound pads conventionally used in the automotive industry. Thus, laminates of the invention have a much lower weight than conventional water deflector/sound pad composites and can provide similar or even enhanced acoustical properties. This reduction in weight typically represents a cost reduction for every vehicle produced because manufacturers seeking a vehicle of a certain weight can use generally less expensive, heavier parts in the remainder of the vehicle.

Further, the acoustical insulation webs are inherently hydrophobic because of their materials of construction whereas the sound pads of conventional water deflector/sound pad composites are typically inherently hydrophilic.

Thus, laminates of the invention can provide a vehicle door with both a water barrier and acoustical insulation and can be secured to an inner panel of a vehicle door in a single step, whereas two assembly steps are typically carried out in the prior art. Therefore, assembly labor costs can be reduced.

BRIEF DESCRIPTION OF THE DRAWING

The invention will be further explained with reference to the drawing, wherein.

These figures, which are idealized, are not to scale and are intended to be merely illustrative and nonlimiting.

DETAILED DESCRIPTION OF ILLUSTRATIVE EMBODIMENTS

The present invention relates to a method for attenuating sound waves passing from a source area to a receiving area, comprising the steps of:

a) providing a nonwoven acoustical insulation web having the properties discussed below; and b) positioning the web between the source area and the receiving area such that a major face of the web intercepts and thereby attenuates sound waves passing from the source area to the receiving area.

The nonwoven acoustical insulation web can be any nonwoven web of thermoplastic fibers which has the required density, average effective fiber diameter and pressure drop. The web typically has a density of about 50 kg/m$^3$ or less, preferably about 20 kg/m$^3$ or less, more preferably about 10 kg/m$^3$ or less; an average effective fiber diameter of about 15 microns or less, preferably about 5 to about 10 microns, more preferably about 5 to about 8 microns; and a pressure drop of at least about 1 mm water at a flow rate of about 32 liters/min, preferably at least about 3 mm water, most preferably about 3 to about 10 mm water. The web may be formed by any well-known technique for forming nonwoven webs such as air-laying, carding, formation with melt-blown microfibers, wet laying, solvent spinning, or melt spinning. The web may also be made with nonwoven polymeric microfibers using solution blown techniques such as disclosed in U.S. Pat. No. 4,011,067 (Carey, Jr.) or electrostatic techniques as disclosed in U.S. Pat. No. 4,069,026 (Simm et al.).

When the web is formed by air-laying or carding, the web is preferably formed from very fine denier staple fibers preferably having a denier of about 2 or less, more preferably about 1 or less, most preferably about 0.5 or less. The very fine denier staple fibers can be formed from thermoplastic materials selected from the group consisting of polyolefin, polyester, polyamide, polyurethane, acrylic, polyvinyl chloride, and mixtures thereof. Other types of fibers having higher deniers can be combined with the very fine denier staple fibers in amounts such that the requirements for density, average effective fiber diameter and pressure drop are met. Such other types of fibers can include binder fibers, static discharge fibers, and flame retardant fibers. Further, flame retardant additives and melt additives or dope additives such as fluorochemicals, antioxidants, pigments, light stabilizers, antistats, and inert fillers can also be incorporated into the web.

Preferably, the very fine denier fibers and any other staple fibers are about 15 Mm to about 75 Mm in length, and more preferably about 25 Mm to about 50 mm in length, although staple fibers as long as 150 Mm could be used. Preferably, the web contains at least about 25 weight percent very fine denier staple fibers, more preferably about 85 weight percent very fine denier staple fibers, most preferably about 100 weight percent very fine denier staple fibers.

The air-laid or carded webs must have sufficient integrity that they can withstand handling and further processing operations such as calendering, shaping, cutting and laminating. To achieve this integrity, any of several well-known methods can be used. Such methods include the use of thermally activated binder fibers in the web, needle-punching, and application of binder resin. Typical binder fibers include amorphous, meltable fibers, adhesive-coated fibers which may be discontinuously coated, and bicomponent binder fibers which have an adhesive component and a supporting component arranged in a coextensive side-by-side, concentric sheath-core or elliptical sheath-core configuration along the length of the fiber with the adhesive component forming at least a portion of the outer surface of the fiber. Useful binder fibers are disclosed in U.S. Pat. No. 4,837,067 (Carey, Jr. et al.), which is incorporated in its entirety herein by reference. Preferably, the binder fiber comprises a crimped sheath-core bonding fiber having a core of crystalline polyethylene terephthalate surrounded by a sheath of an adhesive polymer formed from isophthalate and terephthalate esters available as MELTY TM fibers from Unitika Corp. of Osaka, Japan. Alternatively, bicomponent polyethylene/polypropylene fibers available as CHISSO TM ES fibers from Chisso Corp. of Osaka, Japan can be used.

Typical binder resins include RHOPLEX TM B-15 acrylic resin available from Rohm & Haas of Philadelphia, Pa. and HYCAR TM 26120 acrylic resin available from B.F. Goodrich of Akron, Ohio.

Melt-blown microfiber webs can be formed as described in Wente, Van A. "Superfine Thermoplastic Fibers" in *Industrial Engineering Chemistry*, vol. 48, pages 1342 et seq. (1956) or in Report No. 4364 of the Naval Research Laboratories, published May 25, 1954, entitled "Manufacture of Superfine Organic Fibers" by Wente, Van A., Boone, C. D., and Fluharty, E. L. The aspect ratio (ratio of length to diameter) of the melt-blown microfibers should approach infinity, although melt-blown microfibers are known to be discontinuous. The melt-blown microfibers are generally about 1 to about 25 microns in diameter. In webs according to the present invention, the diameters of the melt-blown microfibers are preferably about 2 to about 15 microns, more preferably about 5 to about 10 microns. The melt-blown microfibers can be formed from thermoplastic fiber-forming materials such as polyolefins, e.g., polyethylene, polypropylene or polybutylene, polyesters such as polyethylene terephthalate or polybutylene terephthalate, polyamides such as nylon 6 or nylon 66, polyurethane, or combinations thereof.

Webs of melt-blown microfibers may also contain staple fibers such as crimped bulking fibers as disclosed in U.S. Pat. No. 4,118,531 (Hauser) which is incorporated in its entirety herein by reference. Such crimped bulking fibers have a continuous wavy, curly or jagged character along their length. The number of crimps per unit length can vary rather widely but generally is in the range of about 1 to about 10 crimps/cm, preferably at least about 2 crimps/cm. The size of the crimped bulking fiber can vary widely but generally is in the range of about 1 denier to about 100 denier, preferably about 3 to about 35 denier. Typically, the crimped bulking fibers have an average length of about 2 to about 15 cm, preferably about 7 to about 10 cm. The crimped bulking is fibers can be formed from polyesters, acrylics, polyolefins, polyamides, polyurethanes, rayons, acetates and mixtures thereof.

The amount of crimped bulking fibers can vary widely depending on the size of the fibers and the amount of increased bulk provided by the fibers. The amount must be such that the required density, average effective fiber diameter and pressure drop are met. For example, in a web formed from polyolefin melt-blown microfibers having an average effective fiber diameter of about 6 microns and polyester staple fibers having a denier of about 6, a length of about 1.5 inches (3.8 cm), and about 3.9 crimps/cm, the ratio of melt-blown microfibers to crimped bulking fibers typically is in the range of about 40:60 to about 95:5, respectively.

Webs used in the invention may also contain microfiber microwebs as disclosed in U.S. Pat. No. 4,813,948 (Insley), which is incorporated in its entirety herein by reference. Microfiber microwebs are typically prepared by divellicating a microfiber source web to form discrete particles of microfiber microwebs. Such microfiber microwebs have relatively dense nuclei with individual fibers and/or fiber bundles protruding therefrom. The nuclei have an average diameter of about 0.05 to about 4 mm, and the fibers and/or fiber bundles extend outwardly to provide a total diameter of the microweb in the range of about 0.07 to about 10 Mm. These microfiber microwebs can be incorporated into nonwoven webs used in the invention, particularly nonwoven webs of melt-blown microfibers and/or air-laid staple fibers.

The basis weight of the web can vary widely depending on the desired end use for the web but typically, the web will have a basis weight of at least about 150 g/m$^2$, more preferably at least about 400 g/m$^2$. The thickness of the web can also vary widely but typically is in the range of about 0.5 cm to about 15 cm, preferably is at least about 2 cm, more preferably at least about 7 cm. The thickness of the web, whether carded, air-laid, or formed with melt-blown microfibers, can be reduced as necessary to achieve the required density as, for example, by calendering.

The nonwoven acoustical insulation web discussed above can further comprise a second layer laminated thereto to form a laminate. The second layer can be selected from the group consisting of scrim, nonwoven fabric, film, and foil. Preferably, the second layer comprises a thermoplastic film. In practicing the method of the invention, the web is typically oriented during the web positioning step such that a major face of the web faces the sound source area and the second layer faces the sound receiving area.

Figure 1:
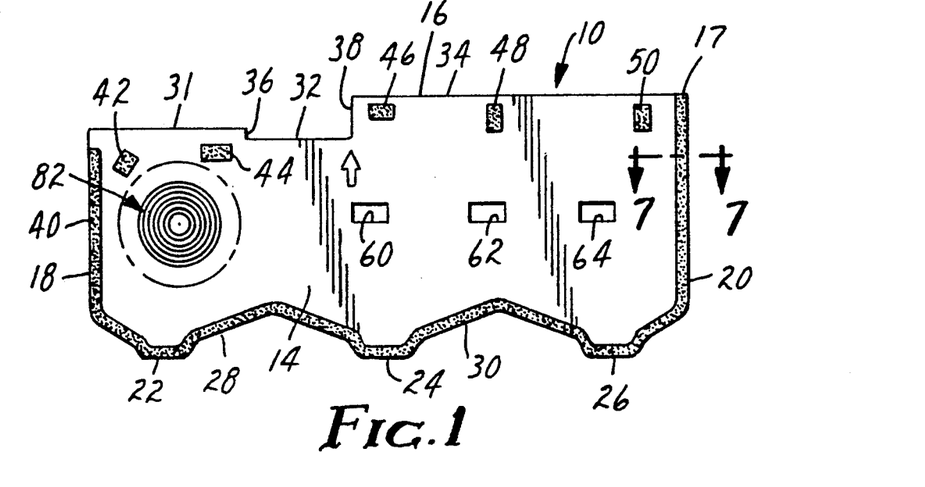
FIG. 1 is a side view of a laminate of the invention, showing the thermoplastic film side of the laminate.
Figure 2:
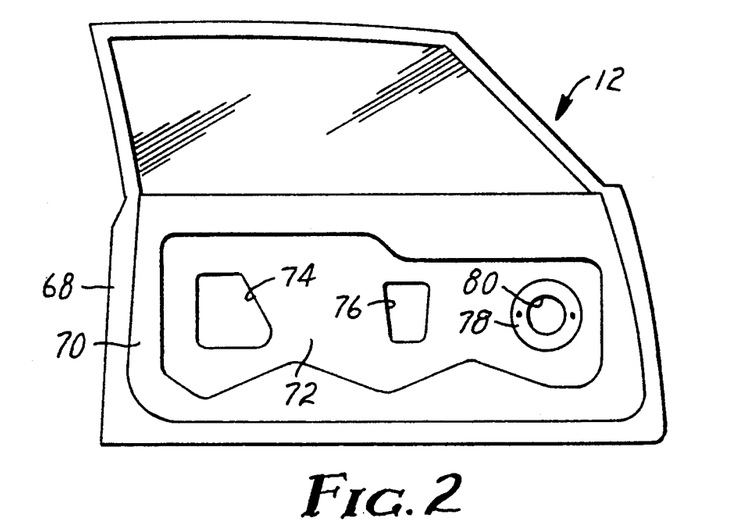
FIG. 2 is a diagrammatical elevational view of the inner panel of a vehicle door.

In a preferred embodiment, the invention relates to a laminate 10 illustrated in FIG. I which is adapted to be secured to the interior door panel of a vehicle door such as a vehicle door 12 illustrated in FIG. 2. The laminate 10 has desirable acoustical insulation properties and can act as a water shield or barrier to prevent water from entering a vehicle body and thus wetting a decorative trim panel disposed on the inside of the vehicle door or the vehicle interior. Although the laminate 10 is described with specific reference to its preferred use in a vehicle door, it is to be appreciated that the laminate 10 has broader applications and could be equally adapted for use in providing acoustical insulating and water barrier properties to other articles, such as small appliances, articles used in architectural applications, and articles used in the transportation industry, e.g., vehicles, airplanes, and trains.

Referring to FIG. 1, the laminate 10 typically comprises a water barrier layer such as a foil or generally planar thermoplastic film 14 formed of a relatively thin thermoplastic material. The film 14 is adapted to act as a water barrier or shield or deflector. Although the film 14 can comprise a variety of thermoplastic materials, it has been found that the strength, flexibility, and durability of polyolefins makes them preferred materials for use as the film 14. Polyethylene, polypropylene, and ethylene-propylene copolymer films are particularly preferred. In addition, although the film 14 could be of a variety of thicknesses, it preferably has a thickness in the range of between about 1 mil (25 microns) and about 10 mils (250 microns), and most preferably has a thickness of between about 1 mil (25 microns) and about 6 mils (150 microns).

Figure 7:
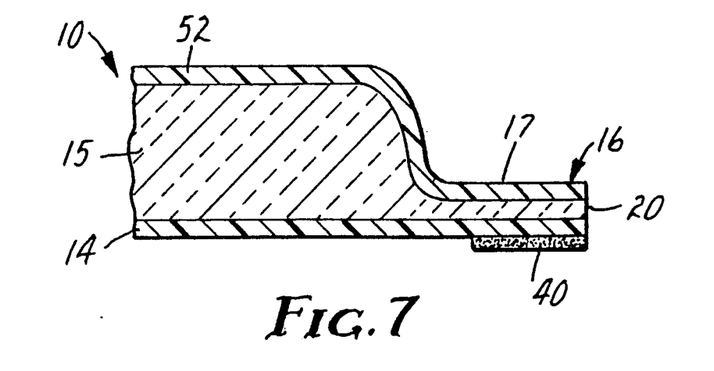
FIG. 7 is an enlarged diagrammatical cross section taken on the line 7—7 of FIG. 1.

Referring to FIG. 7, the laminate 10 also comprises a nonwoven acoustical insulation web 15 laminated to the thermoplastic film 14. The web 15 comprises the nonwoven acoustical insulation web described above and typically comprises melt-blown microfibers and crimped bulking fibers which are thoroughly mixed. U.S. Pat. No. 4,118,531 (Hauser), which is incorporated in its entirety herein by reference, discloses nonwoven webs comprising melt-blown microfibers and crimped bulking fibers for use as thermal insulation and apparatus for preparing such nonwoven webs.

If desired, the laminate 10 can include an optional scrim layer 52 secured to the web 15 opposite the film 14. The optional scrim layer 52 promotes the integrity of the laminate 10. The optional scrim layer 52 can comprise a 0.5 oz./yd$^2$ (17 g/m$^2$) polypropylene spunbond nonwoven scrim material having a thickness of 7 mils (178 microns) which is available from Fiberweb North America Inc. of Greenville, S.C. under the tradename CELESTRA ™.

The laminate 10 is typically made by first forming the web 15 in situ on the optional scrim layer 52 by placing the optional scrim layer 52 on the web collector surface prior to collecting the fibers of the web 15 on the web collector surface. Next, this composite and the film 14 are subjected to a conventional calendering or ultrasonic point bonding operation to laminate the film 14 to the web 15 of the composite and thus form the laminate 10. Alternatively, the laminate 10 can be made by securing the layers of the laminate together with an adhesive, e.g., a hot melt or pressure-sensitive adhesive, or a double-sided adhesive tape comprising such an adhesive. In addition, if desired, a second optional scrim layer (not shown) can be secured between the film 14 and the web 15.

Next, the laminate 10 is typically pressure molded in a heated die (i.e., thermoformed) to form reduced thickness areas 17 along its outer periphery 16 of approximately 20 mils (508 microns) in thickness. In the thermoforming process, the laminate 10 is preferably subjected to a clamping tonnage of about 90 tons over a 4 ft$^2$ (0.4 m$^2$) area at a temperature of about 250° F. (120° C.) for about 1.2 minutes. In the reduced thickness areas 17, the film 14, web 15, and optional scrim layer 52 are thermally consolidated to form an integral structure of a thin gauge. The reduced thickness areas 17 promote the integrity of the laminate 10 in those areas and permit the laminate 10 to be easily handled by vehicle manufacturers during assembly operations. The areas of the laminate 10 that do not contact the die surface during the thermoforming operation are virtually unaltered in web thickness. In these areas of the laminate 10, the acoustical insulating properties of the web 15 are not affected. Optionally, areas of the laminate 10 inside the outer periphery 16 can also be thermally consolidated to a thin gauge to accommodate the contours of a vehicle door as described in more detail below.

Thus, in another of its aspects, the invention relates to a laminate comprising:

a) a nonwoven web comprising thermoplastic fibers, such as the web 15; and b) a second layer such as the film 14 laminated is to the web to form the laminate, wherein portions of the web and the second layer have been thermally consolidated to form reduced thickness areas, such as the reduced thickness areas 17, which are of a thin gauge relative to other portions of the laminate.

The web would typically comprise acoustical insulation. The second layer typically would comprise a scrim, nonwoven fabric, film, or foil, and preferably would comprise a thermoplastic film.

Referring to FIG. 1, in the embodiment illustrated, the laminate 10 includes generally spaced, parallel side edges 18, 20. The bottom edge is somewhat scallop-shaped and includes three aligned and spaced-apart bottom edge portions 22, 24, 26 joined by inwardly extending edge portions 28, 30. The top edge of the laminate 10 is defined by generally parallel and vertically offset edge portions 31, 32, 34. Vertical edge portions 36, 38, respectively, join the top edge portion 31 to the top edge portion 32 and the top edge portion 32 to the top edge portion 34.

To allow the laminate 10 to be attached to the surface to be protected, the film 14 of the laminate 10 has a layer of adhesive applied to selected areas thereof after the laminate 10 is thermoformed as described above. If desired, the surface of the film 14 to which the adhesive is to be applied can be treated prior to applying the adhesive to modify the surface characteristics of the film surface for enhancing bonding of the adhesive to the film 14. U.S. Pat. No. 4,469,732 (Isaksen et al.) discloses a corona discharge treatment which is preferred for this purpose. The adhesive may be applied by known techniques to the treated surface of the film 14 in either continuous or discontinuous patterns, and typically has a relatively uniform thickness which is significantly less than the thickness of the film 14. Many different types of adhesives could obviously be used so long as they have substantially permanently tacky, pressure-sensitive characteristics. In the illustrated embodiment, the adhesive is applied in a relatively narrow band 40 which extends continuously along the vertical side edges 18, 20 and completely across the bottom edge, and is typically applied to the reduced thickness areas 17 of the laminate 10. In addition, spaced-apart generally rectangular areas of adhesive are typically applied to the film 14 adjacent the top edge of the laminate 10 as is shown, for example, at areas 42, 44, 46, 48, 50.

Typically, the adhesive is applied and at least partially cured prior to cutting the laminate 10 to have its final desired peripheral characteristics. Typically, while a plurality of the laminates 10 are in a blank form and prior to the cutting operation, they are processed as necessary and appropriate to at least partially cure their adhesives. This places the adhesive of each laminate in its substantially permanently tacky condition for providing the required pressure-sensitive characteristics.

Any necessary internal openings or apertures such as openings 60, 62, 64 can then be cut through the blanks as necessary to provide access to predetermined areas on the associated surfaces to be protected.

As previously noted, the laminate 10 in the subject embodiment is adapted to provide acoustical insulation to and act as a water deflector for a vehicle door. Thus, in one of its aspects, the invention relates to a method for preventing sound and water from entering a vehicle interior, wherein the laminate 10 is secured to a vehicle door panel to attenuate sound waves which contact a major face of the web 15 of the laminate 10 and prevent the passage of water through the panel and into the vehicle interior. Water does not pass through the panel because the film 14 acts as a water barrier, and the web 15 attenuates sound waves which contact it.

Further, in yet another of its aspects, the invention relates to a process for manufacturing a is vehicle door, wherein the laminate 10 is secured to the inner door panel of a vehicle door to provide acoustical insulation for the vehicle door and to act as a water barrier.

The vehicle door 12 shown in FIG. 2 is generally conventional and comprises an outer panel 68. An inner panel 70 is suitably secured to the outer panel 68 such as by welding along the peripheral edge of the inner panel 70. Typically, the panels are spaced to provide an internal chamber for accommodating various internal window operating mechanisms and the like. For this reason, the inner panel 70 is generally formed with an uneven shape or contour for accommodating and mounting various accessories or the like. In the illustrated embodiment, the inner panel 70 has an inwardly dished-in or recessed area 72 and openings 74, 76 in the recessed area 72. The openings 74, 76 provide access to the various internal door mechanisms and provide a means for mounting such mechanisms. In the embodiment illustrated, the inner panel 70 also includes a generally cylindrical portion 78 extending upwardly from the bottom of the recessed area 72 and having its top surface lying at an elevation generally in the plane of the outer peripheral portion of the inner panel 70. An opening 80 is formed through the recessed area 72 of the inner panel 70 centrally of the generally cylindrical portion 78. Openings such as this are often provided through the inner panel to permit installation of in-door ashtrays, radio speakers, and the like. In the subject embodiment, the opening 80 is designed to permit a speaker to be mounted to the inner panel 70 with the cone and magnet of the speaker extending inwardly through the inner panel 70 to the interior of the door.

Figure 3:
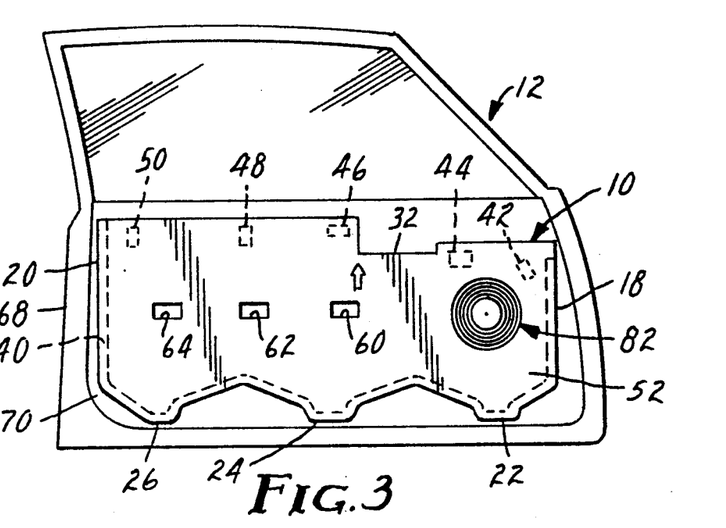
FIG. 3 is a view similar to FIG. 2 but showing the laminate of FIG. 1 in position on the inner panel of a vehicle door and illustrating the nonwoven side of the laminate.

The laminate 10, as previously mentioned, is typically shaped and contoured to overlie the area of the inner panel 70 to be protected. Specifically, FIG. 3 illustrates the laminate 10 in its installed position on the door 12. Generally, a completely flat laminate can is function adequately to provide the proper water barrier protection, provide acoustical insulation, and conform to the contour of the vehicle door. In certain instances, however, discontinuities in the surface of the inner panel 70 make it highly desirable that the laminate 10 have bulges or pockets formed therein to generally conform to the discontinuities and/or to provide space into which various door mechanisms or structures can extend. For example, in the embodiment under discussion, it would be highly desirable if the laminate 10 were provided with a protrusion or pocket to extend into the speaker mounting opening 80 so that the magnet and cone of the installed speaker would be protected without requiring separate installation of an independent protective device. That is, the laminate 10 itself would desirably have the capability of conforming to the magnet and cone of the speaker by deforming into the opening 80.

Many different approaches have been heretofore attempted to provide the necessary bulge or pocket formations in water deflector films like the film 14. For example, the prior art teaches that a bulge or pocket can be formed by a conventional thermoforming operation performed on the film prior to the step of applying adhesive to the film. However, when thermoformed to a bulge or pocket configuration prior to applying the adhesive, the outwardly extending bulge portion interferes with application of the adhesive. The bulge can also create problems in curing the adhesive. When attempts are made to thermoform the bulges or pockets after application of the adhesive, significant difficulties are encountered because the handling, clamping, and other processing steps associated with such thermoforming result in contamination and loss of adhesion of the adhesive surfaces. In addition, the bulges interfere with effective stacking of a plurality of the films for subsequent cutting operations and for subsequent storage and shipping operations.

U.S. Pat. No. 4,696,848 (Jones et al.), which is is incorporated in its entirety herein by reference, discloses that a desired pocket or bulge can be formed in a manner which allows it to remain generally flat and in the plane of the film until the film is installed on a vehicle door. Specifically, the film comprises a pocket or bulge formed in an area adapted to be disposed adjacent the speaker opening 80 so that the speaker cone and magnet can be received in the speaker opening 80 without the necessity of cutting the film. In particular, the film includes a corrugated area or section which overlies the opening 80 when the film is installed. The corrugated area comprises a series of relatively small and closely spaced concentric circular deformations formed about a center portion. When the film is installed on a vehicle door and the center portion of the corrugated area of the film is deflected by an item such as the cone of a speaker extending inwardly through the speaker opening in the inner panel of the vehicle door to the interior of the door, the corrugated area extends inwardly a short distance from the plane of the film to thereby accommodate the cone of the speaker. As noted above, typically after the water deflector film disclosed in U.S. Pat. No. 4,696,848 is installed on a vehicle door, an acoustical insulating layer is adhesively secured to the water deflector film in a separate assembly step.

In the present invention, the laminate 10 can be thermoformed to form a bulge or pocket 82 in the laminate 10 since much of the laminate 10 is thermoplastic. This is a significant feature of the invention because the sound pad/water deflector composites typically used in making vehicle doors cannot be thermoformed to a thin gauge because the sound pad is not thermoformable. The bulge 82 is formed in a manner which allows it to remain generally flat and in the plane of the laminate 10 until the laminate is installed. Typically, the bulge 82 is formed by a thermoforming operation of either the vacuum or pressure type after the web 15, the film 14, and the is optional scrim layer 52 have been integrated. Preferably, the bulge 82 is formed prior to application of the adhesive areas 40, 42, 44, 46, 48, 50 so that the problems previously encountered with adhesive contamination are avoided. Most preferably, the bulge 82 is thermoformed at the same time as the reduced thickness areas 17 of the laminate 10. Typically, the bulge 82 is formed in a manner which allows it to remain generally flat and planar until the laminate 10 is installed on a vehicle door.

Figure 4:
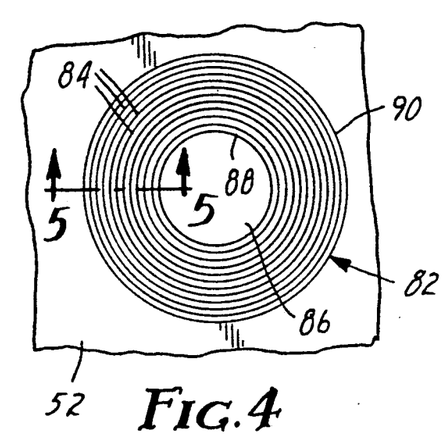
FIG. 4 is an enlarged view of the circled area of FIG. 1.
Figure 5:
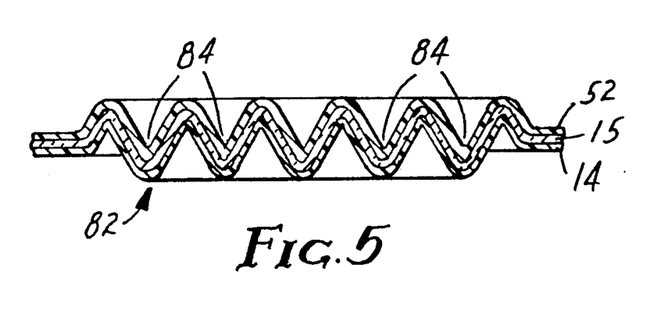
FIG. 5 is an enlarged cross section taken on the line 5—5 of FIG. 4.

When the laminate 10 is installed on a vehicle door like the vehicle door 12, the bulge 82 can cover the speaker opening 80 so that the speaker cone and magnet can extend inwardly through the opening 80 without the necessity of cutting a hole in the laminate 10. In other words, upon being deflected by an item protruding inwardly through the opening 80, the bulge 82 extends inwardly a short distance from the remainder of the laminate 10. Referring to FIGS. 4 and 5, the bulge 82 typically comprises a plurality of relatively small and closely spaced, aligned, annular corrugations or deformations 84, although the bulge 82 can comprise corrugations of different configurations.

Figure 6:
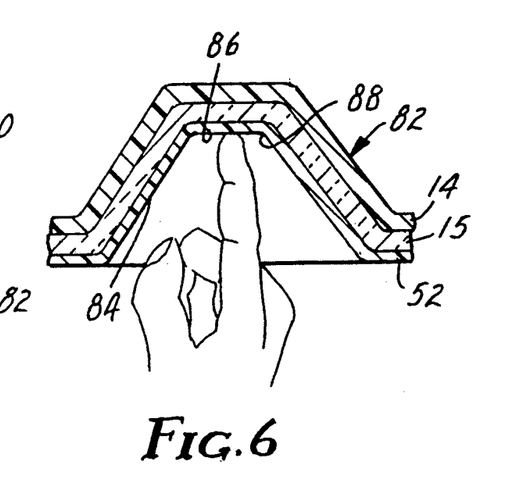
FIG. 6 is a view showing how the circled portion of the laminate can be manually deflected to its pocket or bulge forming position.

As shown in FIG. 4, the corrugations 84 are typically formed as concentric circles about a center portion or hub 86. By forming the corrugations 84, the effective length of the material between an outer edge 88 of the center portion 86 and the outer edge of an outermost corrugation 90 is increased substantially. Thus, the bulge 82 can be deflected to accommodate discontinuities in the contour of a vehicle door and can lie in the same plane as the surrounding undeformed portion of the laminate 10 when the bulge 82 is not deflected. In other words, when the laminate is being installed, manual pressure applied to the center section 86 can readily deflect the bulge 82 to the deflected configuration shown in FIG. 6. However, because the is corrugations 84 are adapted to extend inwardly only a short distance, they do not interfere with printing, cutting, stacking, or storage of the laminate.

Many different pocket shapes and contours can be achieved by varying the amplitude and wavelength of the formed corrugations as the pattern progresses about the predetermined area of the bulge 82. Also, non-formed areas can be included within the bulge 82. For example, if desired, the center portion 86 need not be thermoformed to a thin gauge and can retain its original full thickness to withstand contact with associated equipment and resist inadvertent cut-through. Clearly, such non-formed areas can be included at any desired point or points within the bulge 82. Moreover, adhesive may be applied to the non-formed areas for adhesive engagement with an associated component at the time of installation of the laminate. Further, several different sizes and shapes of bulges 82 could be provided across the laminate 10 at desired locations.

EXAMPLES

The invention will be further explained by the following illustrative examples which are intended to be nonlimiting. Unless otherwise indicated, all amounts are expressed in parts by weight.

EXAMPLES 1–6 AND COMPARATIVE EXAMPLES C1 AND C2

In Examples 1–6 and Comparative Examples C1 and C2, nonwoven acoustical insulation webs were prepared as described in U.S. Pat. No. 4,118,531 (Hauser). The webs comprised melt-blown microfibers ("MB") prepared from a 400 melt flow polypropylene resin Type PP3505 available from Exxon Co. The polypropylene resin was extruded at a total throughput rate of about 20.7 pounds (9.4 kg) per hour. The webs of Examples 2–6 and Comparative Examples C1 and C2 further comprised crimped bulking fibers in the form of 1.5 inch (3.8 cm) long, 6 denier (30.5 microns in diameter), 10 crimps/inch (3.9 crimps/cm) polyester staple fibers ("SF") available as Type T-295 fibers from Hoechst-Celanese Co. of Somerville, N.J.

The resulting webs were evaluated for air flow resistance by measuring the pressure drop ("$\Delta P$") across the web in millimeters water ("mm $H_2O$") as outlined in the ASTM F 778-88 test method. The average effective fiber diameter ("EFD") of each web in microns was calculated using an air flow rate of 32 liters/minute ("L/min.") according to the method set forth in Davies, C. N., "The Separation of Airborne Dust and Particles," Institution of Mechanical Engineers, London, Proceedings 1B, 1952. The results are set forth in Table 1.

TABLE 1

| Examp. No. | Web Content MB/SF (parts) | Basis Weight (g/m$^2$) | Web Thickness (mm) | Web Density (kg/m$^3$) | $\Delta P$ @ 32 L/min (mm $H_2O$) | EFD (microns) |
|---|---|---|---|---|---|---|
| 1 | 100/0 | 428 | 30.9 | 13.851 | 9.96 | 6.08 |
| 2 | 95/5 | 402 | 46.6 | 8.627 | 5.73 | 6.90 |
| 3 | 85/15 | 379 | 67.6 | 5.607 | 3.42 | 7.79 |
| 4 | 65/35 | 389 | 60.6 | 6.419 | 3.02 | 8.70 |
| 5 | 55/45 | 395 | 72.6 | 5.441 | 2.66 | 8.95 |
| 6 | 40/60 | 375 | 70.0 | 5.357 | 1.98 | 10.08 |
| C1 | 25/75 | 377 | 82.4 | 4.575 | 0.93 | 14.17 |
| C2 | 15/85 | 415 | 80.9 | 5.130 | 0.69 | 17.74 |

The average effective fiber diameter and pressure drop across the web were found to be dependent upon the web density and fiber content of the web. The pressure drop across the web decreased and the EFD increased with increasing staple fiber (bulking fiber) content. A higher EFD coincided with a reduced web density and a lower pressure drop, probably because each molecule of air traversing the higher EFD webs during the pressure drop test had a less tortuous path to travel. The pressure drop and EFD values changed significantly when the staple fiber content was 75 parts and greater as illustrated in Table 1.

The samples were then tested for sound absorption using an impedance tube as described in the ASTM C-384 test method. Since the webs varied in thickness and to a certain extent in basis weight, an acoustically transparent wire mesh screen of 60% open area was incorporated into the sample port of the impedance tube. The webs were adjusted in thickness to deliver a specific and constant web density of 20.3 kg/m³. Table 2 summarizes the sound absorption properties measured.

TABLE 2

| Example No. | Web Content MB/SF (parts) | % Absorption at Selected Frequencies |  |  |  |  |  |  |  |
|---|---|---|---|---|---|---|---|---|---|
|  |  | 250 Hz | 500 Hz | 1 kHz | 2 kHz | 3 kHz | 4 kHz | 5 kHz | 6.3 kHz |
| 1 | 100/0 | 9.0 | 23.5 | 78.0 | 87.5 | 85.5 | 87.0 | 91.5 | 96.3 |
| 2 | 95/5 | 12.5 | 22.5 | 66.5 | 93.0 | 94.8 | 92.3 | 92.3 | 93.8 |
| 3 | 85/15 | 11.0 | 15.0 | 48.5 | 92.3 | 98.5 | 96.0 | 95.5 | 94.5 |
| 4 | 65/35 | 10.5 | 19.0 | 46.0 | 87.5 | 99.7 | 98.5 | 96.9 | 96.0 |
| 5 | 55/45 | 11.5 | 16.5 | 47.0 | 89.0 | 99.7 | 97.5 | 95.5 | 95.5 |
| 6 | 40/60 | 10.5 | 19.5 | 37.5 | 79.5 | 95.3 | 98.3 | 96.5 | 94.8 |
| C1 | 25/75 | 10.3 | 14.3 | 33.5 | 70.0 | 81.5 | 90.0 | 89.5 | 89.0 |
| C2 | 15/85 | 10.8 | 19.5 | 34.0 | 70.5 | 86.0 | 92.3 | 90.5 | 90.0 |

Sound absorption values were generally higher for samples having less than 75 parts staple fiber. At 75 parts staple fiber and above, sound absorption properties significantly decreased. Specifically, at 6.3 kHz, the webs of Examples 1–6 had greater than 90% absorption and the webs of Comparative Examples C1 and C2 had 90% absorption or less. Similarly, at 1 kHz, the lowest absorption values were obtained with webs containing at least 75 parts staple fiber. Since the density of each web was the same, reductions in sound absorption with respect to increasing staple fiber content are believed to have been due to lower web pressure drop values (a less tortuous path). Optimum acoustical properties were obtained when air pressure drops exceeded about 1.0 Mm water and average effective fiber diameters were less than about 15 microns.

EXAMPLES 7–9 AND COMPARATIVE EXAMPLES C3–C6

In Examples 7–9 and Comparative Examples C3–C6, nonwoven webs were air-laid on a Rando-Webber apparatus. The webs contained staple fibers ("SF") and bicomponent sheath-core binder fibers ("BF"). The fiber denier ("d") of the staple fibers was varied in each sample to evaluate the effect of fiber denier on sound absorption. The amounts and types of fibers were as follows:

Example 7: 85 parts SF (Type D716, a polyester fiber, 0.5 denier, 3.8 cm long, 5.1 crimps/cm, available from Wellman Inc. of Shrewsbury, N.J.) and 15 parts BF (Type K54, a bicomponent sheath-core fiber, 2 denier, 5.1 cm long, 3.9 crimps/cm, available from Hoechst Celanese Corp. of Somerville, N.J.);

Example 8: 85 parts SF (Type L30, a polyester fiber, 0.75 denier, 3.8 cm long, 5.5 crimps/cm, available from Hoechst Celanese Corp.) and 15 parts BF (Type K54, a bicomponent sheath-core fiber, 2 denier, 5.1 cm long, 3.9 crimps/cm, available from Hoechst Celanese Corp.);

Example 9: 85 parts SF (Type T121, a polyester fiber, 1.2 denier, 3.8 cm long, 5.1 crimps/cm, available from Hoechst Celanese Corp.) and 15 parts BF (Type K54, a bicomponent sheath-core fiber, 2 denier, 5.1 cm long, 3.9 crimps/cm, available from Hoechst Celanese Corp.);

Comparative Example C3: 85 parts SF (Type K411, a polyester fiber, 3 denier, 5.1 cm long, 3.7 crimps/cm, available from Eastman Chemical Products, Inc. of Kingsport, Tenn.) and 15 parts BF (Type K54, a bicomponent sheath-core fiber, 2 denier, 5.1 cm long, 3.9 crimps/cm, available from Hoechst Celanese Corp.);

Comparative Example C4: 85 parts SF (Type T295, a polyester fiber, 6 denier, 3.8 cm long, 3.9 crimps/cm, available from Hoechst Celanese Corp.) and 15 parts BF (Type K54, a bicomponent sheath-core fiber, 4 denier, 5.1 cm long, 3.9 crimps/cm, available from Hoechst Celanese Corp.);

Comparative Example C5: 85 parts SF (Type T295, a polyester fiber, 15 denier, 3.8 cm long, 3.7 crimps/cm, available from Hoechst Celanese Corp.) and 15 parts BF (Type K54, a bicomponent sheath-core fiber, 15 denier, 3.8 cm long, 3.1 crimps/cm, available from Hoechst Celanese Corp.); and Comparative Example C6: 85 parts SF (Type K442, a polyester fiber, 50 denier, 3.2 cm long, 1.0 crimps/cm, available from Eastman Chemical Products, Inc.) and 15 parts BF (Type K54, a bicomponent sheath-core fiber, 15 denier, 3.8 cm long, 3.1 crimps/cm, available from Hoechst Celanese Corp.).

The webs were heated to 310° F. (155° C.) for 60 seconds to melt the binder fiber sheath and then allowed to cool to impart web strength. Table 3 summarizes the fiber denier, basis weight, thickness, density, air pressure drop, and EFD for each sample.

TABLE 3

| Examp. No. | Denier SF/BF | Basis Weight (g/m²) | Web Thickness (mm) | Web Density (kg/m³) | ΔP @ 32 L/min (mm H₂O) | EFD (microns) |
|---|---|---|---|---|---|---|
| 7 | 0.5d/2d | 381 | 29.5 | 12.915 | 2.27 | 11.95 |
| 8 | 0.75d/2d | 372 | 46.6 | 7.983 | 1.445 | 12.81 |
| 9 | 1.2d/2d | 457 | 38.4 | 11.901 | 1.44 | 12.81 |
| C3 | 3d/2d | 481 | 43.0 | 11.186 | 0.635 | 23.32 |
| C4 | 6d/4d | 455 | 42.0 | 10.833 | 0.315 | 33.50 |
| C5 | 15d/15d | 403 | 33.6 | 11.994 | 0.147 | 52.77 |
| C6 | 50d/15d | 521 | 25.6 | 20.351 | 0.105 | 81.55 |

EFD increased and air pressure drop decreased with increasing staple fiber denier. The decrease in air pressure drop across the web and increase in EFD are believed to have been due to a reduction in web tortuosity as the staple fiber denier increased. A significant change in ΔP and EFD values was observed when the denier of the staple fibers exceeded 1.2 denier.

The samples were then tested for sound absorption using an impedance tube as described in the ASTM C-384 test method. The webs were adjusted in thickness (using the wire mesh screen described in Example 1) to deliver a specific and constant web density of 20.3 kg/m$^3$. Table 4 summarizes the sound absorption properties measured.

EXAMPLE 10 AND COMPARATIVE EXAMPLE C7

In Example 10, a web comprising 65 parts polypropylene melt-blown microfibers and 35 parts polyester staple fibers was prepared as described in Example 4 except the basis weight was reduced to 200 g/m$^2$ and the polypropylene resin used in forming the meltblown microfibers was a DYPRO ™ R3860X 70 melt flow

TABLE 4

| Example No. | Denier SF/BF | % Absorption at Selected Frequencies |||||||
|---|---|---|---|---|---|---|---|---|
| | | 250 Hz | 500 Hz | 1 kHz | 2 kHz | 3 kHz | 4 kHz | 5 kHz | 6.3 kHz |
| 7 | 0.5d/2d | 9.0 | 20.5 | 44.0 | 81.3 | 94.0 | 98.1 | 98.2 | 98.5 |
| 8 | 0.75/2d | 9.5 | 19.5 | 32.5 | 63.0 | 81.0 | 88.3 | 89.8 | 90.0 |
| 9 | 1.2d/2d | 12.0 | 21.0 | 42.0 | 75.0 | 87.0 | 92.5 | 90.0 | 91.0 |
| C3 | 3d/2d | 12.0 | 21.0 | 32.5 | 59.5 | 71.3 | 78.5 | 76.0 | 79.0 |
| C4 | 6d/4d | 11.8 | 19.0 | 22.5 | 42.0 | 59.5 | 68.0 | 63.0 | 70.0 |
| C5 | 15d/15d | 10.0 | 17.5 | 21.0 | 36.0 | 47.5 | 56.0 | 49.5 | 55.0 |
| C6 | 50d/15d | 9.5 | 17.0 | 19.0 | 31.0 | 44.0 | 56.0 | 46.5 | 53.0 |

Sound absorption generally decreased with increasing staple fiber denier. Specifically, there was a significant decrease in sound absorption at 1 kHz and higher frequencies when the staple fiber denier was increased from 1.2 denier to 3 denier. This sound absorption performance transition coincides with the sharp increase in EFD and decrease in ΔP of the samples as shown in Table 3.

The effect of varying web density on sound absorption was then evaluated by testing the webs of Example 4 and Comparative Example C3. The webs were tested with an impedance tube as described in Example 1, and sound absorption was measured at increasing web density (decreasing web thickness) values. The results are summarized in Table 5.

resin available from Fina Oil & Chemical Co. of Dallas, Tex. The web was evaluated for % sound absorption using the test method described in ASTM C-384. The sound absorption values at each frequency are shown in Table 6 and represent an average of three data points.

The sample of Comparative Example C7 comprised a prior art water shield and sound pad laminate wherein the sound pad (known in the art as "shoddy") comprised recycled fabrics which had been hammer milled, resinated, and thermoset to a thickness of approximately 6 Mm. This 544 g/m$^2$ sound pad was adhesively laminated to a 6 mil (150 microns) thick polyethylene film and evaluated for sound absorption according to the ASTM C-384 test method with the film side opposite the normal incident sound wave.

TABLE 5

| Example No. | Web Density kg/m$^3$ | % Absorption at Selected Frequencies |||||||
|---|---|---|---|---|---|---|---|---|
| | | 250 Hz | 500 Hz | 1 kHz | 2 kHz | 3 kHz | 4 kHz | 5 kHz | 6.3 kHz |
| 4 | 7.78 | 15.0 | 37.0 | 77.0 | 95.0 | 90.0 | 97.0 | 98.5 | 98.5 |
| 4 | 11.11 | 13.0 | 28.0 | 66.0 | 97.0 | 93.0 | 92.5 | 96.0 | 99.2 |
| 4 | 19.45 | 12.0 | 16.0 | 47.0 | 90.5 | 99.8 | 98.1 | 96.5 | 98.0 |
| 4 | 38.9 | 9.0 | 15.0 | 29.0 | 74.0 | 92.0 | 95.5 | 96.5 | 98.0 |
| 4 | 50.0 | 8.5 | 12.0 | 27.0 | 60.0 | 71.0 | 84.0 | 92.5 | 97.5 |
| 4 | 77.8 | 7.0 | 16.0 | 22.0 | 39.0 | 52.0 | 70.0 | 84.0 | 90.0 |
| C3 | 7.78 | 19.0 | 31.0 | 52.0 | 70.0 | 70.0 | 77.0 | 75.0 | 84.0 |
| C3 | 11.11 | 16.5 | 27.0 | 44.0 | 70.0 | 70.0 | 75.0 | 79.0 | 77.0 |
| C3 | 19.45 | 12.0 | 23.0 | 35.0 | 56.0 | 71.0 | 80.0 | 77.0 | 80.0 |
| C3 | 48.1 | 8.0 | 10.0 | 24.0 | 49.0 | 60.0 | 66.0 | 76.0 | 85.0 |
| C3 | 77.8 | 7.0 | 9.0 | 14.0 | 40.0 | 45.0 | 54.0 | 65.0 | 79.0 |

The absorption values for the sample of Example 4 are relatively high for densities up to about 50.0 kg/m$^3$. At a web density of 77.8 kg/m$^3$, the absorption values are low. The sample of Comparative Example C3 also absorbed less sound as its web density increased. The poorest sound absorption was noted at the highest web densities probably because the webs became more like solid nonporous surfaces and consequently became reflective rather than absorptive.

Table 6 illustrates that the sample of Example 10 had better sound absorption properties than the shoddy and water shield laminate of Comparative Example C7. Furthermore, the web of Example 10 had a basis weight which was 63% lower than the basis weight of the sound pad tested in Comparative Example C7.

TABLE 6

| Example | Wt.[1] | Percent Absorption |||||||
|---|---|---|---|---|---|---|---|---|
| | | 250 Hz | 500 Hz | 1 kHz | 2 kHz | 4 kHz | 5 kHz | 6.3 kHz | Avg. |
| 10 | 200 | 4.8 | 5.0 | 14.2 | 38.9 | 67.3 | 81.3 | 91.3 | 43.3 |
| C7 | 544 | 4.0 | 3.5 | 8.3 | 27.3 | 50.5 | 65.5 | 73.5 | 33.2 |

[1]Web basis weight in g/m$^2$

EXAMPLES 11–18

In Examples 11–18, nonwoven webs comprising 65 parts melt-blown microfibers and 35 parts staple fibers and having varying basis weights were prepared as described in Example 10. The webs were laminated on one or both sides to a cast ethylene-propylene copolymer film which was 62.5 microns thick, or to a biaxially oriented polypropylene film (BOPP) which was 25 microns thick.

Lamination was achieved by thermal calendering or by ultrasonic point bonding. In calendering, the roll temperature was adjusted to within approximately 10° F. (5.5° C.) of the film melt temperature (Tm). Additionally, the nip on the calender was gapped to approximately 0.040 inches (1 mm) to minimize web deformation. For ultrasonic point bonding, a mandrel which could provide a bonding point every 4 lineal inches was selected. In the cross direction, the mandrels were spaced 2 inches apart. The resulting material had a point bond density of 21 bond points/ft$^2$ (225 bond points/m$^2$).

To convert the laminates into finished parts, the samples of Examples 11-18 were pressed in a heated die. The die was heated to 250° F. (120° C.) and the laminates were thermoformed at 90 tons over a 4 ft$^2$ (0.4 m$^2$) area for 1.2 minutes. The samples were then removed and the excess material trimmed, resulting in a laminate adapted to be applied to a vehicle door panel.

Table 7 provides a description of each laminate and the corresponding % sound absorption measured at frequencies ranging from 250 Hz to 2 kHz. The laminates of Examples 11-18 were compared to the shoddy laminate of Comparative Example C7. The sound absorption tests for Examples 11-18 were conducted as outlined in the ASTM C384 test method with the exception of the number of sample replicates. In these examples, the test was conducted only once per sample.

TABLE 7

| Example | Description | % Absorption | | | | |
|---|---|---|---|---|---|---|
| | | 250 Hz | 500 Hz | 1 kHz | 2 kHz | Avg. |
| 11 | 100 g/m$^2$ (16.11 kg/m$^3$) web with BOPP film on both sides by ultrasonic bonding. | 8.0 | 7.0 | 5.0 | 30.0 | 12.5 |
| 12 | 150 g/m$^2$ (16.62 kg/m$^3$) web with scrim[1] on 1 side, BOPP on other side, by ultrasonic bonding. | 7.0 | 5.0 | 5.0 | 30.0 | 11.8 |
| 13 | 150 g/m$^2$ (16.62 kg/m$^3$) web with scrim[1] on 1 side, cast on other side, by ultrasonic bonding. | 8.0 | 6.0 | 5.0 | 35.0 | 13.5 |
| 14 | 150 g/m$^2$ (16.62 kg/m$^3$) web with scrim[1] on 1 side, BOPP on other side, by calender bonding. | 9.0 | 6.0 | 6.0 | 30.0 | 12.8 |
| 15 | 200 g/m$^2$ (15.32 kg/m$^3$) web with BOPP on both sides by ultrasonic bonding. | 7.0 | 8.0 | 17.0 | 70.0 | 25.5 |
| 16 | 200 g/m$^2$ (15.32 kg/m$^3$) web with BOPP on both sides by calender bonding. | 8.0 | 7.0 | 10.0 | 50.0 | 18.8 |
| 17 | 200 g/m$^2$ (15.32 kg/m$^3$) web with cast on both sides by calender bonding. | 5.0 | 5.5 | 13.0 | 86.0 | 27.4 |
| 18 | 200 g/m$^2$ (15.32 kg/m$^3$) web with cast on 1 side only by calender bonding. | 5.0 | 6.0 | 11.0 | 68.0 | 22.5 |
| C7 | 544 g/m$^2$ (90.67 kg/m$^3$) shoddy pad with 150 micron film. | 4.0 | 3.5 | 8.3 | 27.3 | 10.8 |

[1]Scrim material was a 0.5 oz./yd$^2$ (17 g/m$^2$) polypropylene spunbond nonwoven available from Fiberweb North America Inc. of Greenville, South Carolina under the tradename CELESTRA ™.

In Examples 11-18, sound absorption performance was found to be dependent upon web basis weight. The 200 g/m$^2$ nonwoven webs tested in Examples 15-18 generally performed better than the lighter webs tested in Examples 11-14 and the shoddy pad tested in Comparative Example C7.

EXAMPLES 19-22

Transmission loss in decibels (dB) was measured in Examples 19-22 in accordance with the SAE J-1400 test method.

In Example 19, a web was prepared as described in Example 10 and a 0.5 oz/yd$^2$ (17 g/m$^2$) polypropylene spunbond nonwoven scrim layer available from Fiberweb North America Inc. of Greenville, S.C. under the tradename CELESTRA ™ was applied to both sides of the web by ultrasonic point bonding. In Example 20, a web was prepared as described in Example 10 except the basis weight was adjusted to 250 g/m$^2$ and a 0.5 oz/yd$^2$ (17 g/m$^2$) polypropylene spunbond nonwoven scrim layer available melt flow polypropylene resin available from Fina Oil & Chemical Co. and having an average effective fiber diameter of about 8 microns) where they were thoroughly mixed with the melt-blown microfibers. The stream of melt-blown microfibers, microfiber microwebs, and staple fibers then continued to the collector where the web was formed. The web comprised a mixture of melt-blown microfibers, microfiber microwebs and staple fibers in a weight percent ratio of about 52:30:18, respectively. The web had a basis weight of 407 g/m² and a thickness of 1.8 cm. A 0.5 oz/yd² (17 g/m²) polypropylene spunbond nonwoven scrim layer available from Fiberweb North America Inc. under the tradename CELESTRA ™ was then applied to one side of the web by ultrasonic point bonding.

In Example 22, a web comprising 85 parts melt-blown microfibers and 15 parts staple fibers was prepared as described in Example 3 except the basis weight was 400 g/m² and the resin used in forming the melt-blown microfibers was a DYPRO ™ R 3860X 70 melt flow resin available from Fina Oil & Chemical Co. and the staple fiber was a 3.8 cm long, 3 denier, polypropylene Type T101 staple fiber available from Hercules Co. of Wilmington, Del. The 400 g/m² web was embossed on a 5% surfaced roll gapped at 85 mils (0.22 cm) and heated to 275° F. (135° C.).

TABLE 8

| Example | Transmission Loss (dB) | | | | | | | | |
|---|---|---|---|---|---|---|---|---|---|
| | 250 Hz | 500 Hz | 1 kHz | 2 kHz | 4 kHz | 5 kHz | 6.3 kHz | 10 kHz | Avg. |
| 19 | 2.0 | 0.0 | 5.0 | 3.0 | 7.0 | 9.0 | 13.0 | 19.0 | 7.3 |
| 20 | 3.0 | 1.0 | 5.0 | 3.0 | 8.0 | 10.0 | 14.0 | 20.0 | 8.0 |
| 21 | 3.0 | 4.0 | 8.0 | 7.0 | 14.0 | 16.0 | 21.0 | 29.0 | 12.8 |
| 22 | 3.0 | 4.0 | 9.0 | 10.0 | 17.0 | 20.0 | 26.0 | 34.0 | 15.4 |

Table 8 illustrates that sound transmission loss was generally enhanced by increasing the web basis weight.

Various modifications and alterations of this invention will become apparent to those skilled in the art without departing from the scope and spirit of this invention.

What is claimed is:

1. A method for attenuating sound waves passing from a source area to a receiving area, comprising the steps of:
   a) providing a nonwoven acoustical insulation web comprising thermoplastic fibers, said web having an average effective fiber diameter of less than about 15 microns, a thickness of at least about 0.5 cm, a density of less than about 50 kg/m³, and a pressure drop of at least about 1 mm water at a flow rate of about 32 liters/min.; and
   b) positioning said web between the source area and the receiving area such that a major face of said web intercepts and thereby attenuates sound waves passing from the source area to the receiving area.

2. The method of claim 1 wherein the average effective fiber diameter of said web is about 5 to about 10 microns.

3. The method of claim 1 wherein the density of said web is less than about 20 kg/m³.

4. The method of claim 1 wherein the density of said web is less than about 10 kg/m³.

5. The method of claim 1 wherein the pressure drop is about 3 mm water to about 10 mm water at a flow rate of about 32 liters/min.

6. The method of claim 1 wherein said fibers comprise melt-blown microfibers.

7. The method of claim 1 wherein said fibers comprise a mixture of melt-blown microfibers and crimped bulking fibers.

8. The method of claim 7 wherein said melt-blown microfibers and crimped bulking fibers are present in a weight percent ratio of about 40:60 to about 95:5, respectively.

9. The method of claim 1 wherein said web comprises very fine denier staple fibers.

10. The method of claim 9 wherein said very fine denier staple fibers have a denier of about 2 or less.

11. The method of claim 9 wherein said web further comprises additional staple fibers selected from the group consisting of binder fibers and static discharge is fibers.

12. The method of claim 11 wherein said very fine denier staple fibers comprise at least about 85 weight percent of said web.

13. The method of claim 1 further comprising the step of laminating a second layer to said web to form a laminate prior to said web positioning step.

14. The method of claim 13 wherein said second layer is selected from the group consisting of scrim, nonwoven fabric, film, and foil.

15. The method of claim 14 wherein said second layer comprises a thermoplastic film.

16. The method of claim 13 wherein said web is oriented during said web positioning step so that a major face of said web faces the source area and said second layer faces the receiving area.

17. The method of claim 14 wherein said fibers comprise melt-blown microfibers and crimped bulking fibers.

18. The method of claim 17 wherein said melt-blown microfibers and crimped bulking fibers are present in a weight percent ratio of about 40:60 to about 95:5, respectively.

19. The method of claim 14 wherein the average effective fiber diameter of said web is about 5 to about 10 microns.

20. The method of claim 1 wherein said web comprises microfiber microwebs.

21. A laminate comprising:
   a) a nonwoven acoustical insulation web comprising thermoplastic fibers, said web having an average effective fiber diameter of less than about 15 microns, a thickness of at least about 0.5 cm, a density of less than about 50 kg/m³, and a pressure drop of at least about 1 mm water at a flow rate of about 32 liters/min.; and
   b) a second layer laminated to said web, said laminate being applied to the inner panel of a vehicle door.

22. The laminate of claim 21 wherein said second layer is selected from the group consisting of scrim, nonwoven fabric, film, and foil.

23. The laminate of claim 22 wherein said second layer comprises a thermoplastic film.

24. The laminate of claim 21 wherein the average effective fiber diameter of said is about 5 to about 10 microns.

25. The laminate of claim 21 wherein the density of said web is less than about 20 kg/m³.

26. The laminate of claim 21 wherein the density of said web is less than about 10 kg/m³.

27. The laminate of claim 21 wherein the pressure drop is about 3 Mm water to about 10 Mm water at a flow rate of about 32 liters/min.

28. The laminate of claim 21 wherein said fibers comprise melt-blown microfibers.

29. The laminate of claim 21 wherein said fibers comprise a mixture of melt-blow microfibers and crimped bulking fibers.

30. The laminate of claim 29 wherein said meltblown microfibers and crimped bulking fibers are present in a weight percent ratio of about 40:60 to about 95:5, respectively.

31. The laminate of claim 21 wherein said web comprises very fine denier staple fibers.

32. The laminate of claim 31 wherein said very fine denier staple fibers have a denier of about 2 or less.

33. The laminate of claim 31 wherein said web further comprises additional staple fibers selected from the group consisting of binder fibers and static discharge fibers.

34. The laminate of claim 31 wherein said very fine denier staple fibers comprise about 85 weight percent of said web.

35. The laminate of claim 21 wherein said web comprises microfiber microwebs.

36. The laminate of claim 21 wherein said laminate comprises pressure molded reduced thickness areas along its outer periphery, said reduced thickness areas having a thin gauge relative to other portions of said laminate.

37. The laminate of claim 36 wherein said second layer is selected from the group consisting of scrim, nonwoven fabric, film, and foil.

38. The laminate of claim 36 wherein said second layer comprises a thermoplastic film.

39. A method for preventing sound and water from entering a vehicle interior, comprising the steps of:
  a) providing a laminate comprising a nonwoven acoustical insulation web and a second layer laminated to said web, said web comprising thermoplastic fibers and having an average effective fiber diameter of less than about 15 microns, a thickness of at least about 0.5 cm, a density of less than about 50 kg/m$^3$, and a pressure drop of at least about 1 mm water at a flow rate of about 32 liters/min.; and
  b) securing said laminate to a panel of a vehicle to attenuate sound waves which contact a major face of said web of said laminate and prevent the passage of water through the panel and into the vehicle interior.

40. A process for manufacturing a vehicle door, comprising the steps of:
  a) providing a vehicle door having outer and inner panels secured together with a space therebetween for accommodating various mechanisms, the inner panel comprising a recessed area comprising at least one opening;
  b) providing a laminate comprising a nonwoven acoustical insulation web and a second layer laminated to said web, said web comprising thermoplastic fibers and having an average effective fiber diameter of less than about 15 microns, a thickness of at least about 0.5 cm, a density of less than about 50 kg/m$^3$, and a pressure drop of at least about 1 mm water at a flow rate of about 32 liters/min.; and
  c) securing said laminate to the inner panel with said second layer of said laminate disposed adjacent to the inner panel so that said second layer can provide water barrier protection and said web can provide acoustical insulation.

41. The process of claim 40 wherein said second layer is a thermoplastic film.

42. A nonwoven acoustical insulation web comprising thermoplastic fibers, said web having an average effective fiber diameter of less than about 15 microns, a thickness of at least about 0.5 cm, a density of less than about 20 kg/m$^3$, and a pressure drop of at least about 1 mm water at a flow rate of about 32 liters/min.

43. The web of claim 42 wherein the average effective fiber diameter of said web is about 5 to about 10 microns.

44. The web of claim 42 wherein the density of said web is less than about 10 kg/m$^3$.

45. The web of claim 42 wherein the pressure drop is about 3 mm water to about 10 mm water at a flow rate of about 32 liters/min.

46. The web of claim 42 wherein said fibers comprise melt-blown microfibers.

47. The web of claim 42 wherein said fibers comprise a mixture of melt-blown microfibers and crimped bulking fibers.

48. The web of claim 47 wherein said melt-blown microfibers and crimped bulking fibers are present in a weight percent ratio of about 40:60 to about 95:5, is respectively.

49. The web of claim 42 wherein said web comprises very fine denier staple fibers.

50. The web of claim 47 wherein said very fine denier staple fibers have a denier of about 2 or less.

51. The web of claim 50 further comprising additional staple fibers selected from the group consisting of binder fibers and static discharge fibers.

52. The web of claim 51 wherein said very fine denier staple fibers comprise at least about 85 weight percent of said web.

53. The web of claim 40 wherein said web comprises microfiber microwebs.

* * * * *

UNITED STATES PATENT AND TRADEMARK OFFICE
CERTIFICATE OF CORRECTION

PATENT NO. : 5,298,694                               Page 1 of 2

DATED : March 29, 1994

INVENTOR(S) : Delton R. Thompson and Joseph A. Stroh

It is certified that error appears in the above-indentified patent and that said Letters Patent is hereby corrected as shown below:

| | |
|---|---|
| Col. 1, line 52 | delete "is" |
| Col. 2, line 47 | replace "Mm" with -- mm -- both occurrences |
| Col. 5, lines 8, 9 and 10 | replace "Mm" with -- mm -- all occurrences |
| Col. 6, line 12 | delete "is" |
| Col. 6, line 39 | replace "Mm" with -- mm -- |
| Col. 8, line 23 | delete "is" |
| Col. 9, line 29 | delete "is" |
| Col. 13, line 35 | replace "Mm" with -- mm -- |
| Col. 16, line 31 | replace "Mm" with -- mm -- |
| Col. 16, line 33 | "for sound" should read -- for % sound -- |

UNITED STATES PATENT AND TRADEMARK OFFICE
CERTIFICATE OF CORRECTION

PATENT NO. : 5,298,694
DATED : March 29, 1994
INVENTOR(S) : Delton R. Thompson and Joseph A. Stroh It is certified that error appears in the above-indentified patent and that said Letters Patent is hereby corrected as shown below:

| | |
|---|---|
| Col. 20, line 9 | delete "is" |
| Col. 21, line 2 | replace "Mm" with -- mm --, both occurrences |
| Col. 21, line 22 | "comprise about" should read -- comprise at least about -- |

Signed and Sealed this

Fourth Day of October, 1994

Attest:

BRUCE LEHMAN

*Attesting Officer*    *Commissioner of Patents and Trademarks*